Nov. 29, 1966  A. KAMPINSKY  3,289,205
METHOD AND APPARATUS FOR DETERMINING ELECTROMAGNETIC
CHARACTERISTICS OF LARGE SURFACE
AREA PASSIVE REFLECTORS
Filed May 17, 1965  2 Sheets-Sheet 1

INVENTOR
Abe Kampinsky

BY
*J. M<sup>c</sup>Coy*
*Leonard Ravin*
ATTORNEYS

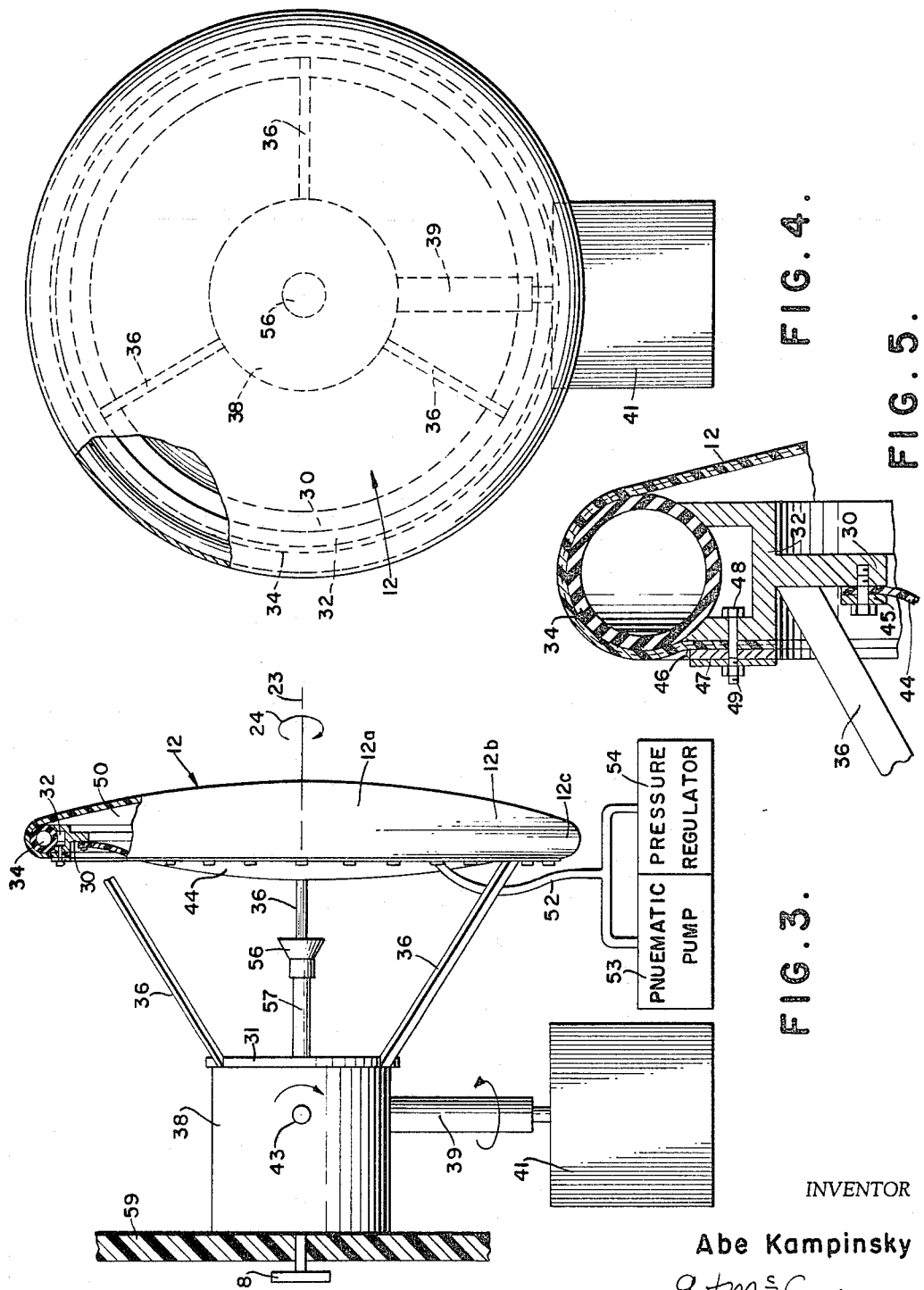

United States Patent Office 3,289,205
Patented Nov. 29, 1966

3,289,205
METHOD AND APPARATUS FOR DETERMINING ELECTROMAGNETIC CHARACTERISTICS OF LARGE SURFACE AREA PASSIVE REFLECTORS
Abe Kampinsky, Lanham, Md., assignor to the United States of America as represented by the Administrator of the National Aeronautics and Space Administration
Filed May 17, 1965, Ser. No. 456,578
15 Claims. (Cl. 343—18)

The invention described herein may be manufactured and used by and for the Government of the United States of America for governmental purposes without the payment of any royalties thereon or therefor.

The present invention relates generally to electromagnetic wave measurement techniques, and more particularly to a method and apparatus for determining the backscatter and the transmission characteristics of large surface area passive reflectors when illuminated by electromagnetic energy.

One type of communications satellite is a passive reflector in orbit around the earth. Typically the reflector may take the form of a sphere, and may be implemented by inflating a balloon that has been launched into orbit. The Echo I and II balloons are examples of passive communication satellites of this type.

The membrane forming the reflecting surface of the balloon may take many forms, ranging from a completely occluded metallic surface to an open mesh like construction, and may be fabricated from numerous materials of varying thickness and combinations of plastic membrane with expandable coverings of metal mesh or wire grids. After the inflating gas or vapor has expanded the balloon, the plastic membrane is disintegrated by ultraviolet radiation or by chemical means to leave a reflective sphere, which may be in the form of an open-mesh or grid structure, in earth orbit. It is apparent that the surface perturbations and the resulting effects on the reflection and transmission of incident radio frequency energy will vary with the particular structure of membrane used to fabricate the balloon.

It is important to know prior to launch, the backscatter and transmission coefficients for a particular reflector configuration of a given material in terms of surface qualities as a function of variables such as frequency and wave polarization. Because of the size, complexity and discrete nature of the perturbations of the reflecting surfaces that are generally used, theoretical calculations are complex and extensive. Since the backscatter area is generally many hundreds or thousands of wavelengths of the incident radio frequency energy (balloon diameters range from 100 to 150 feet for frequencies of 1–10 gc.), prelaunch tests on a complete balloon are expensive, difficult and often impractical. Further, scaling of the balloon to a smaller diameter, without a similar scaling of the mechanical properties of the membrane, will not produce reliable results. In the ideal situation it is desirable to test a relatively small sample of the selected membrane for radio frequency backscatter and transmission characteristics in such a manner to obtain results identical to those obtained from similar tests performed on a fully inflated balloon of the same material.

Accordingly, it is the object of the present invention to provide a simplified method for evaluating the radio frequency backscatter of a membrane sample used to form the reflecting surface of an inflatable passive reflector.

Another object of the invention is to provide a simplified method for determining the reflection and transmission coefficients of a membrane utilized in forming an inflated passive reflector having a spherical or other applicable geometrical shape.

A further object of the invention is to provide apparatus for the measurement of the radio frequency backscatter from a sample segment of a large spherical conductive surface formed from an inflatable membrane.

Further objects as well as features and attending advantages of the invention will become apparent from the following description when taken in conjunction with the accompanying drawings, in which:

FIGURE 3 is a side view, in partial section, of one embodiment of apparatus utilized in carrying out the invention;

FIGURE 4 is a front view of the apparatus of FIGURE 3; and

FIGURE 5 is an enlarged view, in section, of a portion of the apparatus of FIGURES 3 and 4.

According to the present invention, in order to determine the radio frequency backscatter from a large passive reflector formed from an inflated membrane, a sample of the membrane encompassing the basic backscatter area of the reflector is mounted on a suitable frame and subjected to pneumatic pressure to simulate the total reflecting surface in terms of surface perturbations, skin stress, internal pressure, radius of curvature and surface contour. The basic backscatter area of the membrane sample is illuminated with radio frequency energy from a radar test unit. A suitable transition is provided between the membrane sample and its support frame so that the mechanical interface preserves or matches the balloon contour and provides mechanical control of the electrical interface to match the boundary conditions of current flow and minimize fringing effects. The radar test unit may be arranged so that the backscatter may be obtained from the sample membrane for monostatic and bistatic angles. The incident wave of radio frequency energy may be linearly or circularly polarized, and the sample membrane may be rotatable about a center axis so that the alignment of the ribs forming the mesh or grids of the reflecting surface may be oriented in a given plane of polarization. In addition, by positioning a receiving horn behind the sample membrane transmission coefficients may be obtained.

In the following description a particular embodiment of the invention for determining the backscatter of a spherical reflector, such as may be provided by a balloon of the type utilized for the Echo series communication satellites, and where at the diameter of the balloon is at least 100 times the wavelength of the radio frequency energy, will be discussed in detail. It is to be understood, however, that the underlying concepts of the invention are equally applicable to conductive surfaces of other shapes, such as cones, convex, biconvex, and lenticular surfaces, and that various occluded membranes containing a variety of open mesh or grid-like reflective surfaces may be utilized. For example, another type of passive reflector which may be formed from the type of materials mentioned and placed into earth orbit has a biconvex shape, with the major reflecting surface thereof encompassing a selected segment of a sphere.

Figure 1:
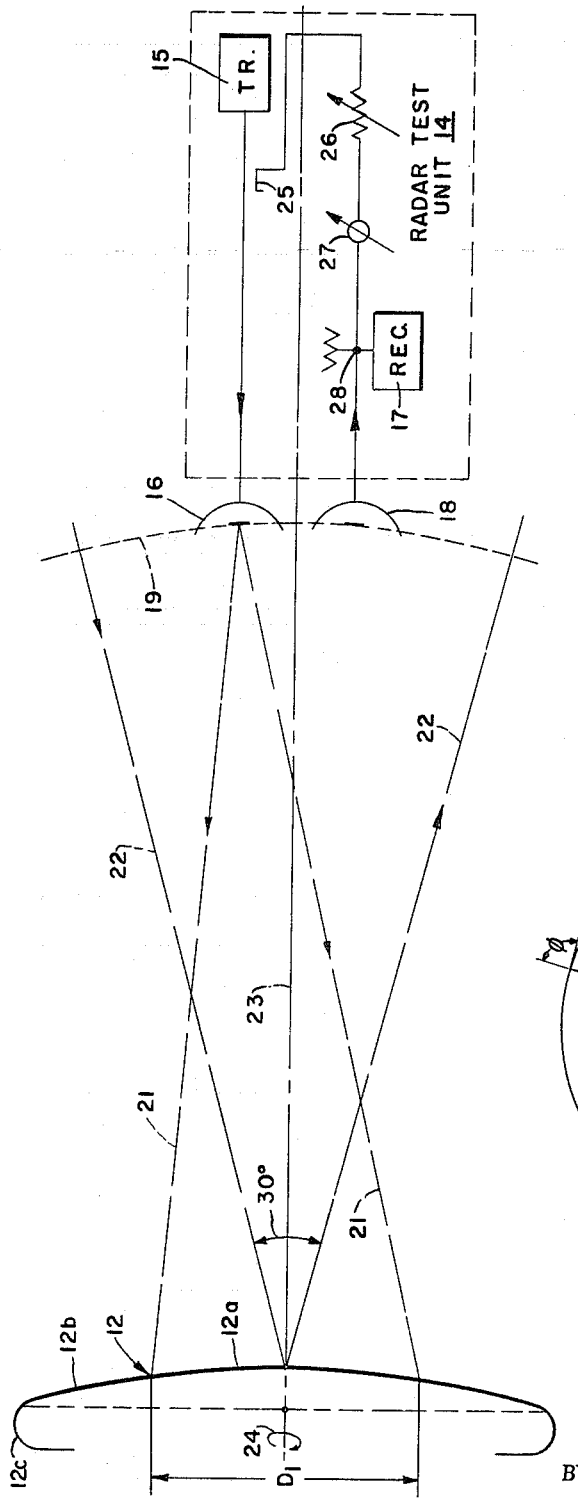
FIGURE 1 is a schematic representation illustrating the method and apparatus utilized in the present invention.

With reference now to FIGURE 1, sample membrane 12 has a spherical center portion 12a, selected and contoured in a manner to be subsequently described, to provide a basic backscatter area defined by chordal diameter D. Continuous with center portion 12a is intermediate portion 12b, also spherically contoured in the same manner as center portion 12a, and extending radially from center portion 12a so that an illumination taper for incident radio frequency energy in the order of −10 db may be provided as its outer periphery. Continuous with intermediate portion 12b is edge portion 12c, adapted to provide an interface between membrane sample 12 and its supporting frame in the manner to be subsequent described. This interface provides both a controllable mechanical and an electrical transition between sample membrane 12 and its support structure that preserves the spherical contour of center portion 12a and intermediate portion 12b, and eliminates current flow fringing effects at the peripheral edges of sample membrane 12. It is to be understood that in practical application sample membrane 12, including portions 12a, 12b and 12c, is composed of a continuous sheet of the specific material under investigation. As mentioned, this material may be a continuous, thin metallic sheet, or a plastic membrane of material such as mylar having an open mesh or grid-like metallic structur eimbedded therein.

Center portion 12a of sample membrane 12 is illuminated with radio frequency energy from radar test unit 14. Typically, but not limiting, radar test unit 14 is a CW frequency varying system, and includes transmitter 15, transmitting antenna 16, receiver 17 and receiving antenna 18. Alternately, a pulse radar or other types of CW radar may be utilized, and a single antenna system, with suitable duplexing or transmit-receive and background nulling arrangements, may be utilized. By employing separate transmitting and receiving antennas, each independently moveable on tracks through an arc indicated by dotted line 19, it is possible to make both monostatic (transmit and receive at the same location) and bistatic (transmit and receive at different locations) backscatter determinations. Thus, as illustrated, monostatic measurements may be obtained by positioning both the transmitting and receiving antennas at the same effective location (represented by antenna 16 in FIGURE 1) and bistatic measurements may be made by positioning the transmitting antenna at a first point along the arc indicated by dotted line 19 and by positioning the receiving antenna at a second point along this arc.

The area of sample membrane 12 illuminated for both monostatic and bistatic determinations (encompassing basic backscatter area 12a) is outlined by dashed lines 21. A representative bistatic angle (typically 30 degrees) is illustrated by dashed lines 22. Transmitting antenna 16 may be a horn, parabolic dish or array sufficiently directive so that the edges of sample membrane 12, at the outer periphery of intermediate portion 12b, are underilluminated with respect to center portion 12a. Typically, this underillumination may be in the order of −10 db.

In instances where the reflective surface of sample membrane 12 contains an open mesh or grid-like structure, the ribs forming the mesh or grid may not be regular or symmetrical, and accordingly the backscatter and transmission coefficients may vary with respect to the orientation of the ribs in a given plane of polarization. Thus, the wave from radar test unit 14 may be circularly polarized or linearly polarized, with sample membrane 12 rotatable around an axis 23 normal to the center of central portion 12a, as indicated by arrow 24. This allows the ribs and metallic cross members forming the mesh or grid structure of sample membrane 12 to be oriented in a given plane when illuminated with a linearly polarized wave.

There may also be included in radar unit 14 a background cancellation circuit including coupler 25, attenuator 26, phase shifter 27, and power divider 28. By this arrangement it is possible to couple energy of proper phase and amplitude from transmitter 15 to receiver 17 in a manner that will effectively cancel backscatter and background returns obtained from the supporting frame and the associated mounting structure. Accordingly, receiver 17 may be set at a reference level that compensates for backscatter from other sources than from sample membrane 12.

Figure 2:
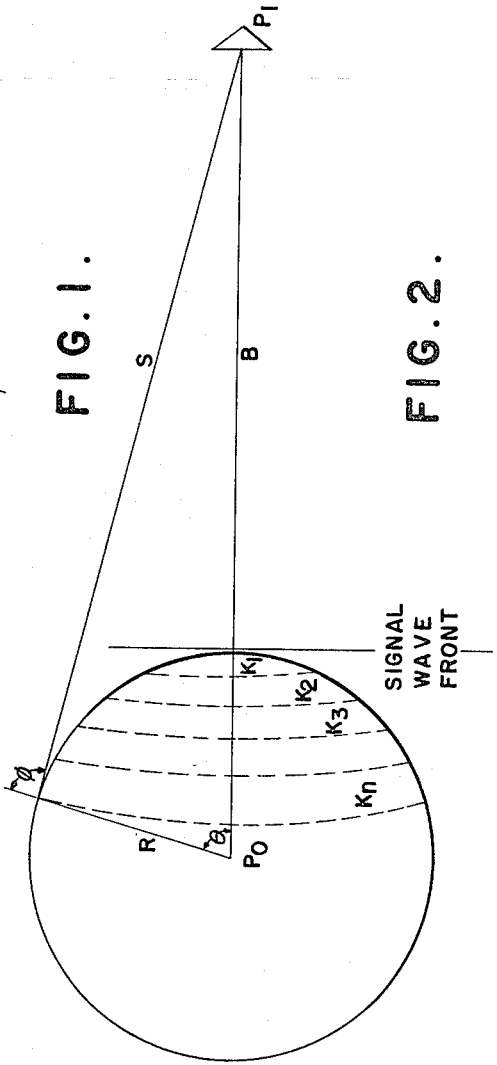
FIGURE 2 is a diagram illustrating some of the underlying concepts of the invention.

As mentioned above, the basic backscatter area of 12a of sample membrane 12 is a spherical section having chordal diameter D. This is equivalent to the chord length of the first Fresnel Zone of a spherical reflective surface. With particular reference to FIGURE 2, there is shown the cross-section of a reflecting spherical surface of radius R, taken through its diameter.

The focal point of receiving antenna 18 is located at point $P_1$, a distance B from the periphery of the sphere. In a practical application both distances are R and B are much larger than $\lambda$, the wavelength of the test signal illuminating the sphere. Each Fresnel Zone $K_1$, $K_2$, $K_3$ ... $K_n$ is bounded by spherical shells or radii B, $B+\lambda/4$, $B+\lambda/2$ ... $B+n\lambda/4$. The increments of reflected energy received at $P_1$ from each Fresnel Zone $K_1$, $K_2$, $K_3$ ... $K_n$ decreases as B increases. The total reflected energy $U_p$ received at point $P_1$ is expressed by:

$$U_p = \frac{K_1}{2} + \frac{K_n}{2}$$

where $n$ is odd, and $$U_p = \frac{K_1}{2} - \frac{K_n}{2}$$

where $n$ is even

For a full sphere the energy reflected by Fresnel Zone $K_n$ approaches zero, and this condition is closely approximated by providing an interface between the sample membrane 12 and its support structure that matches the boundary conditions of current flow for a sphere. In the summation of all increments of energy received at $P_1$, the contribution of Fresnel Zone $K_1$ remains and alternate contributions of Fresnel Zone $K_2$–$K_{n-1}$ cancel. As a result, Fresnel Zone $K_1$ provides a basic backscatter area that approximates, to a high degree, the total reflection from a spherical surface. This basic backscatter area, in turn, may be obtained by taking a chorded diameter of the reflective spherical surface such that $$D = \sqrt{2\lambda R}$$

in accordance with the well known Fresnel Zone relationships.

In implementing the above method, sample membrane 12 is attached to a ring to cover one major surface thereof. The other major surface of the ring is also enclosed to provide an air chamber. The air chamber, in turn, is subjected to controlled pneumatic pressure so that sample membrane 12 is contoured to simulate a segment of a sphere, encompassing the basic backscatter area discussed above. The ring is also provided with an annular extension having a variable, flexible surface to produce a radio frequency transition of calculated geometric shape between the membrane and the ring that minimizes edge reflections or current flow fringing effects, and to produce a mechanical transition between the membrane and the ring that minimizes mechanical biasing of the basic backscatter area.

With particular reference to FIGURES 3 and 4, ring 30 is supported by three arms 36, forming a tripod having its base 31 mounted on turntable 38. Base 31 is rotatably mounted on turntable 38 so that, as illustrated by arrow 24, sample membrane 12 may be rotated about an axis 23 that is normal to the center of central portion 12a. As mentioned, this allows the ribs or cross members forming the mesh or grid-like reflective surface of sample membrane 12 to be oriented in a given plane when illuminated with a linearly polarized wave. The outer periphery of ring 30 is provided with a channel-shaped member or rim 32. Pneumatic tubing 34 is mounted on rim 32. Pneumatic tubing 34 is constructed of a flexible material such as rubber or plastic, is air tight, and contains a simple valve (not shown) so that it may be inflated to a desired pressure.

Shaft 39 rotatably supports turntable 38 from pedestal 41 so that sample membrane 12 and its support structure are rotatable in azimuth. Turntable 38 is also rotatable about shaft 43 in elevation. Turntable 38 and pedestal 41, as well as the rotatable support for base 31 and arrangements for elevation and azimuth rotation thereof, may be any typical radar antenna mount, as, for example, mounts of the type provided for search and height finding radar. In structural detail such mounts form no part of the invention. It is only necessary that such mounts provide rotatable support for the tripod, including arms 36 and base 31, supporting ring 30.

The back surface of ring 30 is enclosed with a sheet of material 44, such as vinyl plastic, that is transparent to radio frequency energy, or material that is absorbent where necessary to control energy when the transmission coefficient will result in interference between incident and reflected energy. Material 44 is secured to the periphery of ring 30 to form, in conjunction with sample membrane 12, an air chamber 50. A suitable seal may be provided by securing material 44 to ring 30 with an adhesive, or by utilizing a sealing gasket 45, bolted to ring 30, as illustrated in FIGURE 5.

Sample membrane 12 extends over the perimeter of pneumatic tube 34 and is secured to the back edge of channel member or rim 32. A suitable seal may be provided by utilizing sealing gasket 46, of a flexible material such as rubber, and clamping ring 47. A series of threaded lugs 48 and nuts 49, disposed around the periphery of rim 32, bias clamping 47 towards rim 32 to provide a pressure seal. Alternately, sample membrane 12 may be secured and sealed to rim 32 by suitable adhesive material. As a result, sample membrane 12 and material 44 form air chamber 50, essentially air tight.

Variable and controllable air pressure is applied to air chamber 50 via flexible tubing 52, expanding sample membrane 12 so that it simulates air pressure in an inflated reflector, such as a balloon, and produces a segment of a sphere representing the basic backscatter area of a spherical surface. The air pressure in chamber 50 may be supplied by pneumatic pump 53, with the pressure regulated and controlled by pressure regulator 54. Tubing 52 is flexible and of sufficient length to allow sample membrane 12 to be rotated by turntable 38 through a desired are in both azimuth and elevation, and to allow sample membrane 12 to be rotated about axis 23 for orientation of the reflecting surface thereof with respect to the polarization of an incident wave. In instances where sample membrane 12 is to be rotated through a 360° azimuth, pump 53 and regulator 54 may be located in turntable 38 and adapted to turn therewith, and a rotary joint may be provided to allow rotation of sample membrane 12 about axis 23.

The support structure for sample membrane 12 shown in FIGURES 3 and 4 may also include receiving horn 56 and reference target 58. Receiving horn 56 is positioned behind central portion 12a of the sample membrane by a section of wave guide 57, and is adapted to receive energy propagated through sample membrane 12 and supply it to suitable receiving and detection apparatus (not shown) positioned in turntable 38. This allows the transmission coefficient of sample membrane 12 to be determined concurrently with backscatter measurements. Reference target 58 is a metallic plate of a known area and may be utilized to provide a reflection surface of known characteristics for calibration of radar test system 14. Absorbent material 59 may be placed between reference target 58 and turntable 38 to minimize background reflections.

As an illustration of a practical application of the method and apparatus described, assume backscatter measurements are to be made for a 135 feet diameter balloon (such as the Echo II satellite) at a frequency of 1,000 mcs. Thus R is 67.5 feet and λ is 1 foot and the chordal diameter D is 11.5 feet. Sample membrane 12, equivalent to a spherical segment of approximately 22 feet in diameter, is mounted in the manner shown. This diameter provides the basic backscatter area (center portion 12a in FIGURE 1) having an 11.5 feet chordal diameter, and allows sufficient peripheral area (intermediate portion 12b in FIGURE 1) to provide the desired −10 db illumination taper at the edges of sample membrane 12. Control of the air pressure in the chamber 50 imparts a spherical contour to center portion 12a and intermediate portion 12b of the sample membrane 12 to simulate the original balloon. The air pressure pneumatic tubing 30 also provides a controlled transition at the periphery of sample membrane 12 (edge portion 12c), resulting in both a mechanical and an electrical interface between the sample membrane 12 and its support structure that preserves the desired spherical contour over center portion 12a and intermediate portion 12b, and minimizes fringing effects around edge portion 12c of sample membrane 12. It is to be understood that for a given configuration of reflector under investigation the electrical contour for the transition between sample membrane 12 and its support structure, as provided by edge portion 12c, to match the boundary conditions of current flow and minimize fringing effects may be readily calculated, and once calculated may be simulated and controlled by the pressure in pneumatic tubing 34.

Thus with sample membrane 12 mounted as shown in FIGURES 3–5, and illuminated with radio frequency energy in the manner discussed in conjunction with FIGURES 1 and 2, including monitoring and calibrating radar test unit 14 in accordance to known techniques, it is possible to determine the backscatter from a total balloon to be formed from the membrane under investigation. Transmission characteristics may also be determined from a test receiver in conjunction with horn 56. A number of samples of different material may be tested without fabricating a total balloon for each sample to greatly simplify the test procedure and reduce cost. For an example, a total balloon of the type described, having a surface area of 57,300 square feet, may be simulated for the purpose of backscatter and transmission evaluation by sample having a total surface area of less than 500 square feet and having a basic area of approximately 400 square feet. In addition, the contour of the sample under test may be modified to represent various distortions on the balloon by varying and controlling the air pressure in air chamber 50 and pneumatic tubing 34.

The invention provides, therefore, a method and apparatus for determining the backscatter and transmission characteristics of large passive reflectors by illuminating a relatively small sample of the membrane from which the reflector is to be formed with electromagnetic energy, thus eliminating the necessity of performing tests on the total reflector. While a specific embodiment has been described with particularity for the purpose of explaining the invention, it is not to be so limited and modifications and variations thereof should be obvious to those skilled in the art. For example, while the method and apparatus of the invention has been described in conjunction with a spherical reflector, the invention may find utility in conjunction with large reflecting surfaces of other shapes, such as reflectors having conical and lenticular surfaces. In addition, the method and apparatus of the invention may be utilized for the study of surface enhancement of radar returns from specular surfaces, surface wave phenomena, multi-layer spherical lens systems, and curved surface antennas and ground planes. It is therefore to be understood that within the scope of the appended claims the invention may be practiced otherwise than specifically set forth.

What is claimed as new and desired to be secured by Letters Patent of the United States is:

1. The method of determining the backscatter of an electromagnetic wave incident on a large reflecting surface, said reflecting surface being formed from an inflated membrane, with the dimensions of said reflecting surface being large with respect to the wavelength of said electromagnetic wave, said method comprising the steps of providing a sample of the membrane having a central area encompassing at least the first Fresnel Zone of electromagnetic energy incident thereon, contouring the central area and the adjacent peripheral area of said sample of membrane to conform to a segment of said reflecting surface, illuminating the central area of said sample of membrane with an electromagnetic wave, said electromagnetic wave being directed so that the periphery of said sample of membrane is underilluminated a specified amount with respect to said central area, and receiving reflections of said electromagnetic energy from said sample segment of membrane, said reflections being indicative of the backscatter from the total reflective surface to be formed from said membrane.

2. The method of determining the backscatter of an electromagnetic wave incident on a large reflecting surface, said reflecting surface being formed from an inflated membrane, with the dimensions of said reflecting surface being large with respect to the wavelength of said electromagnetic wave, said method comprising the steps of providing an enclosed chamber having one major surface thereof formed from a sample of the membrane from which reflecting surface is to be formed, said sample of membrane having a central area encompassing at least the first Fresnel Zone of electromagnetic energy incident thereon, inflating said enclosed chamber to contour the central area and adjacent periphery areas of said sample of membrane to conform to a segment of said reflecting surface, the outer peripheral edges of said sample of membrane being provided with an interface that minimizes fringing effects of an electromagnetic wave incident thereon, illuminating the central area of said sample of membrane with an electromagnetic wave, said electromagnetic wave being directed so that adjacent areas near the periphery of said sample of membrane are underilluminated a specified amount with respect to said central area, and receiving reflections of electromagnetic energy from said sample of membrane, said received reflections providing a measurement of backscatter of the total reflecting surface to be formed from said membrane.

3. The method of determining the radio frequency backscatter of a spherical passive reflector, said spherical reflector being formed from an inflated membrane, with the radius R of said spherical reflector being large with respect to the wavelength $\lambda$ of radio frequency energy incident thereon, said method comprising the steps of providing a sample of said membrane having a backscatter area encompassing a segment of a sphere having a chordal diameter $D=\sqrt{2\lambda R}$, said membrane sample further having a peripheral area surrounding said backscatter area, contouring said membrane sample including said backscatter area and said peripheral area to conform to a segment of said spherical reflector, illuminating said backscatter area with radio frequency energy, said radio frequency energy being directed such that said peripheral area is underilluminated a specified amount with respect to said backscatter area, and receiving reflections from said backscatter area, said reflections indicative of the total backscatter from the spherical reflector to be formed from said membrane.

4. The method of determining the radio frequency backscatter of a spherical passive reflector, said reflector being formed from an inflated membrane, with the radius R of said reflector being large with respect to the wavelength $\lambda$ of radio frequency energy incident thereon, said method comprising the steps of providing an enclosed chamber having one major surface thereof formed from a sample of said membrane having a backscatter area encompassing a segment of a sphere having a chordal diameter $D=\sqrt{2\lambda R}$, said membrane sample further having a peripheral area surrounding said backscatter area, inflating said chamber to contour said membrane sample including said backscatter area and said peripheral area to conform to a segment of said sphere, with the peripheral edges of said membrane sample terminating with an interface that minimizes fringing effects of radio frequency energy incident thereon, illuminating said backscatter area and said peripheral area with radio frequency energy, said radio frequency energy being directed such that said peripheral area is underilluminated a specified amount with respect to said backscatter area, and receiving reflections from said backscatter area, said reflections being indicative of the total backscatter providing by the spherical reflector to be formed from said membrane.

5. The method of determining the backscatter and the transmission coefficient of a radio frequency wave incident on a large reflecting surface, said reflecting surface being formed from an inflatable plastic membrane having an expandable metal mesh imbedded therein, with the dimensions of said reflecting surface being large with respect to the wavelength of said radio frequency wave, said method comprising the steps of providing an enclosed chamber having one major surface thereof formed from a sample of the membrane from which said reflecting surface is to be formed, said sample of membrane having a central area encompassing at least the first Fresnel Zone of a radio frequency wave incident thereon, inflating said enclosed chamber to contour the central area and adjacent periphery areas of said sample of membrane to conform to a segment of said reflecting surface, the outer peripheral edges of said sample of membrane being provided with an interface that minimizes fringing effects of a radio frequency wave incident thereon, illuminating the central area of said sample of membrane with a radio frequency wave, said radio frequency wave being directed so that adjacent areas near the periphery of said sample of membrane are underilluminated a specified amount with respect to said central area, receiving reflections of said radio frequency wave from said sample of membrane, said reflections providing a measurement of the backscatter of a reflecting surface to be formed from said membrane and receiving transmissions of said radio frequency wave through said sample of membrane, said transmissions providing a measurement of the transmission coefficient of a reflecting surface to be formed from said membrane.

6. The method of determining the backscatter of a radio frequency wave incident on a large reflecting surface, said reflecting surface being formed from an inflatable membrane, with the dimensions of said reflecting surface being large with respect to the wavelength of said radio frequency wave, said method comprising the steps of providing an enclosed chamber having one major surface thereof formed from a sample of the membrane from which said reflecting surface is to be formed, said sample of membrane having a central area encompassing at least the first Fresnel Zone of a radio frequency wave incident thereon, inflating said enclosed chamber to contour the central area and adjacent periphery areas of said sample of membrane to conform to a segment of said reflecting surface, the outer peripheral edges of said sample of membrane being provided with an interface that minimizes fringing effects of a radio frequency wave incident thereon, illuminating the central area of said sample of membrane with a radio frequency wave from transmitting means positioned at a first point with respect to said sample of membrane, said radio frequency wave being directed so that adjacent areas near the periphery of said sample of membrane are underilluminated a specified amount with respect to said central area, and receiving reflections of said radio frequency wave from said sample of membrane at one or more other points with respect to said sample of membrane, said received reflections providing a measurement of backscatter of the total reflecting surface to be formed from said membrane.

7. The method of determining the backscatter of a radio frequency wave incident on a large reflecting surface, said reflecting surface being formed from an inflatable plastic membrane having an expandable metal mesh imbedded therein, with the dimensions of said reflecting surface being large with respect to the wavelength of said radio frequency wave, said method comprising the steps of providing an enclosed chamber having one major surface thereof formed from a sample of the membrane from which said reflecting surface is to be formed, said sample of membrane having a central area encompassing at least the first Fresnel Zone of a radio frequency wave incident thereon, inflating said enclosed chamber to contour the central area and adjacent periphery areas of said sample of membrane to conform to a segment of said reflecting surface, the outer peripheral edges of said sample of membrane being provided with an interface that minimizes fringing effects of a radio frequency wave incident thereon, illuminating the central area of said sample of membrane with a circularly polarized radio frequency wave, said radio frequency wave being directioned so that adjacent areas near the periphery of said sample of membrane are underilluminated a specified amount with respect to said central area, and receiving reflections of said radio frequency wave from said sample of membrane, said reflections providing a measurement of the backscatter from the total reflective surface to be formed from said membrane.

8. The method of determining the backscatter of a radio frequency wave incident on a large reflecting surface being formed from an expandable metal mesh imbedded therein, with the dimensions of said reflecting surface being large with respect to the wavelength of said radio frequency wave, said method comprising the steps of providing an enclosed chamber having one major surface thereof formed from a sample of the membrane from which said reflecting surface is to be formed, said sample of membrane having a central area encompassing at least the first Fresnel Zone of a radio frequency wave incident thereon, inflating said enclosed chamber to contour the central area and adjacent periphery areas of said sample of membrane to conform to a segment of said reflecting surface, the outer peripheral edges of said sample of membrane being provided with an interface that minimizes fringing effects of a radio frequency wave incident thereon, illuminating the central area of said sample of membrane with a linearly polarized radio frequency wave, said radio frequency wave being directioned so that adjacent areas near the periphery of said sample of membrane are underilluminated a specified amount with respect to said central area, orienting the metal mesh imbedded in said sample of membrane in a plane parallel to the wave front of said linearly polarized radio frequency wave, and receiving reflections of said linearly polarized radio frequency wave from sample of membrane, said reflections providing a measurement of the backscatter from the total reflective surface to be formed from said membrane for a given orientation of the wire mesh imbedded therein with respect to the wave front of a linearly polarized wave.

9. In apparatus for determining the radio frequency backscatter of an inflated passive reflector, a rigid annular member, a flexible ring positioned around the perimeter of said annular member, a sample of membrane of reflective material from which said passive reflector is to be formed, said sample of membrane having a backscatter area and a peripheral area, mounting means for positioning said sample of membrane over one major surface of said annular member and around the perimeter of said flexible ring, a second membrane non-reflective to radio frequency energy enclosing the other major surface of said annular member, said sample of membrane and said second membrane being joined by said mounting means to form a closed pneumatic chamber, and means for maintaining pressure in said pneumatic chamber such that the backscatter area and the peripheral area of said sample of membrane provides a contour simulating a segment of the passive reflector to be formed from the reflective material.

10. The apparatus defined in claim 9 and wherein said flexible ring is a pneumatic tube, with the pressure therein providing controllable mechanical biasing and selected electrical boundary conditions for the contour of said sample of membrane at its peripherial edges.

11. In apparatus for determining the radio frequency backscatter of an inflated passive reflector, an annular member, a flexible ring positioned around the perimeter of said annular member, support means for said annular member, said support means being adapted to rotate said annular member in azimuth and elevation, a sample of membrane from which said passive reflector is to be formed, said sample of membrane having a backscatter area and a peripheral area, means for mounting said sample of membrane over one major surface of said flexible ring, a second membrane non-reflective to radio frequency energy enclosing the other major surface of said annular member, said sample of membrane and said second membrane forming a pneumatic chamber, means for rotating said annular member about an axis normal to the center of said sample of membrane mounted thereon, and means for maintaining pressure in said pneumatic chamber such that the backscatter area and the peripheral area of said sample of membrane provides a contour simulating a segment of said passive reflector.

12. In apparatus for determining the radio frequency backscatter from a sample of membrane from which an inflated spherical passive reflector is to be formed, with the radius R of said spherical reflector being large with respect to the wavelength $\lambda$ of a radio frequency wave incident thereon, an annular member having a diameter D greater than $\sqrt{2\lambda R}$, means for mounting said sample of membrane over one major surface of said annular member, a second membrane non-reflective to electromagnetic energy enclosing the other major surface of said annular member, said sample of membrane and said second membrane forming a pneumatic chamber, and means for maintaining pressure in said pneumatic chamber such that said sample of membrane provides a contour simulating a segment of a sphere.

13. In apparatus for determining the radio frequency backscatter of an inflated spherical passive reflector, said spherical reflector being formed from a thin flexible membrane, with the radius R of said spherical reflector being large with respect to the wavelength $\lambda$ of a radio frequency wave incident thereon, an annular member having a diameter D greater than $\sqrt{2\lambda R}$ a flexible ring positioned around the perimeter of said annular member, a sample of membrane from which said reflector is to be formed, said sample of membrane having a backscatter area of a diameter equal to $\sqrt{2\lambda R}$ and also a peripheral area, means for mounting said sample of membrane over one major surface of said annular member and over the perimeter of said flexible ring, a second membrane non-reflective to radio frequency energy enclosing the other major surface of said annular member, said sample of membrane and said second membrane forming a pneumatic chamber, and means for maintaining pressure in said pneumatic chamber such that the backscatter area and the peripherial area of said sample of membrane provides a contour simulating a segment of a sphere.

14. The apparatus defined in claim 13 and wherein said flexible ring is a pneumatic tube, with the pressure therein providing controllable mechanical biasing and selected electrical boundary conditions for the contour of said sample of membrane at its peripherial edges.

15. In apparatus for determining the radio frequency backscatter of an inflated spherical passive reflector, said spherical reflector being formed from a thin flexible membrane, with the radius R of said spherical reflector being large with respect to the wavelength $\lambda$ of a radio frequency wave incident thereon, an annular member having a diameter D greater than $\sqrt{2\lambda R}$, a flexible ring positioned around the perimeter of said annular member, support means for said annular member, said support means being adapted to rotate said annular member in azimuth and elevation, a sample of membrane having a backscatter area of a diameter equal to $\sqrt{2\lambda R}$ and also a peripherial area, means for mounting said sample of membrane over one major surface of said annular member and over the perimeter of said flexible ring, a second membrane nonreflective to radio frequency energy enclosing the other major surface of said annular member, said sample of membrane and said second membrane forming a pneumatic chamber, means for rotating said annular member about an axis normal to the center of said sample of membrane mounted thereon, and means for maintaining pressure in said pneumatic chamber such that the backscatter area and the peripheral area of said sample of membrane provides a contour simulating a segment of a sphere.

References Cited by the Examiner

UNITED STATES PATENTS

| | | | |
|---|---|---|---|
| 3,025,463 | 3/1962 | Luoma | 343—18 |
| 3,081,432 | 3/1963 | Balwanz | 325—67 |
| 3,130,406 | 5/1964 | Jones-Hinton | 343—18 |

OTHER REFERENCES

Emerson, W. H.: Broadband Absorbing Materials, in Tele-Tech and Electrical Industries, page 74, November 1955.

Newman, D. J.: Radiation Absorbers, in Electronics Design, pages 44–47, Feb. 1, 1957.

References Cited by the Applicant

| | | |
|---|---|---|
| 2,552,489 | 5/1951 | Lawson. |
| 3,031,928 | 5/1962 | Kopito. |
| 3,144,910 | 12/1963 | Rymes. |

CHESTER L. JUSTUS, *Primary Examiner.*

G. M. FISHER, *Assistant Examiner.*